United States Patent [19]

Prudenziati

[11] 4,456,074
[45] Jun. 26, 1984

[54] FORCE MEASUREMENT DEVICE FOR CONTROLLING THE POSITION OF AN IMPLEMENT FOR TOWING BY AN AGRICULTURAL MACHINE

[75] Inventor: Maria Prudenziati, Modena, Italy

[73] Assignee: Fiat Trattori S.p.A., Modena, Italy

[21] Appl. No.: 344,484

[22] Filed: Feb. 1, 1982

[30] Foreign Application Priority Data

Feb. 12, 1981 [IT] Italy ................ 67194 A/81

[51] Int. Cl.³ ............... A01B 63/112; G01L 5/16
[52] U.S. Cl. .................... 172/7; 73/862.04; 73/862.57
[58] Field of Search ............... 172/7, 9, 10; 280/446 R, 446 A; 73/862.54, 862, 57, 862.04

[56] References Cited

U.S. PATENT DOCUMENTS

| | | | |
|---|---|---|---|
| 2,457,616 | 12/1948 | Van Dyke et al. | 338/2 |
| 3,814,188 | 6/1974 | Ahne | 172/7 |
| 3,992,934 | 11/1976 | Clark | 73/862.54 |
| 4,016,644 | 4/1977 | Kurtz | 338/2 X |
| 4,315,548 | 2/1982 | Nakamura et al. | 172/7 X |
| 4,355,692 | 10/1982 | Ostrelich | 338/2 |

FOREIGN PATENT DOCUMENTS 1577341 10/1980 United Kingdom ............ 73/862.04

*Primary Examiner*—Charles A. Ruehl
*Attorney, Agent, or Firm*—Frost & Jacobs

[57] ABSTRACT

A force measuring device for an implement for towing an agricultural machine comprising at least one connection arm between the implement and a flexure bar mounted on said agricultural machine, at least one lever connecting the arm to a control system, wherein said control system comprises an electrical circuit arranged to control the movement of the lever by means of a mechanical and/or hydraulic member, the electrical circuit comprising at least one resistive element fixed to a portion of the flexure bar, the resistive element being constructed of a material the resistance of which is proportional to the deformation which the element undergoes when in use.

5 Claims, 5 Drawing Figures

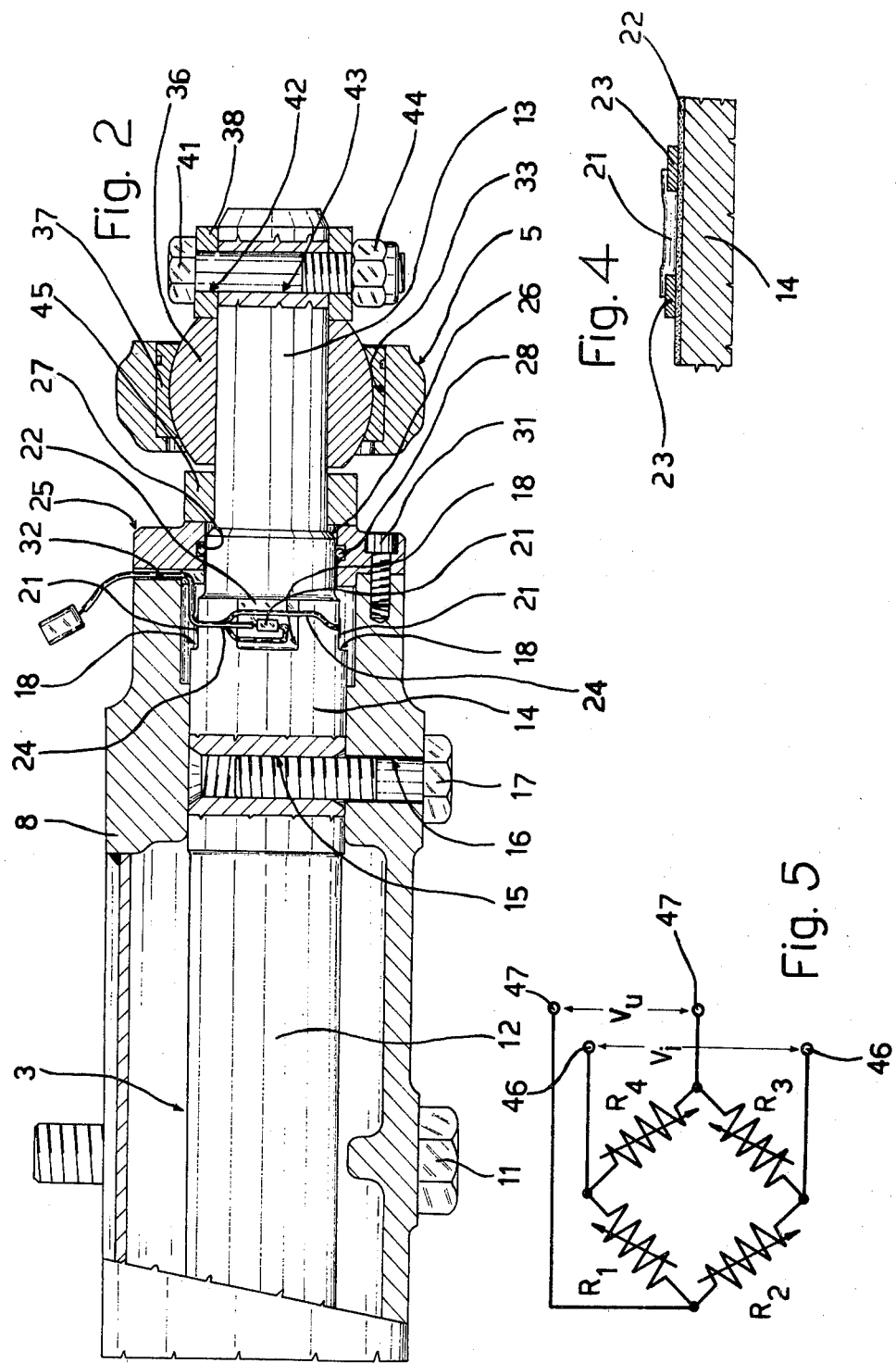

_4,456,074_

FORCE MEASUREMENT DEVICE FOR CONTROLLING THE POSITION OF AN IMPLEMENT FOR TOWING BY AN AGRICULTURAL MACHINE

BACKGROUND OF THE INVENTION

This invention relates to a force measurement device for controlling the position of an implement for towing by an agricultural machine.

Said devices are known to enable the force acting on the implement connection to be measured in order to allow the position of the implement to be controlled automatically. This control enabling the performance of the agricultural machine to be optimized and, more specifically, enables the power of the machine to be distributed in an optimum manner between its implement towing or conveying function and that function involving the positioning of the implement at the required depth in the earth furrow being worked.

The devices presently in use comprise a flexure bar mounted on the agricultural machine and connected by two arms to said implement. Under the action of the force transmitted by the implement when in operation, said bar deforms, and this deformation is determined by mechanical members which transmit their movement to a generally hydraulic control system as the function of the deformation of the flexure bar. The control system is able to cause raising or lowering of the implement, and thus control its position in relation to the working depth required, to the earth quality and to the agricultural machine power.

A force measurement device is also known, which instead of said mechanical members, uses an electronic member able to determine the deformation of the flexure bar by suitable sensors, and to feed a corresponding electrical signal to said control system.

The aforesaid devices have certain serious drawbacks.

In particular, the devices comprising mechanical members for determining the deformation of the flexure bar have limited sensitivity because said mechanical members do no detect small deformations of the flexure bar. Thus, as the flexure bar has to deform in a manner which can be appreciated by said mechanical members, it is subject to considerable wear. To prevent any possible breakage, it must be constructed of a suitably treated and thus high-cost material. Moreover, such devices have a low speed of action on said control system, due to the complexity of the constituent elements of the mechanical members. Finally, because of the aforegoing, the aforesaid devices are complicated from the design and construction aspect, and are of high production cost.

Although the devices comprising said electronic member for determining the deformation of the flexure bar have certain advantages over the aforesaid devices in terms, for example, of constructional simplicity and speed of action, they are difficult to maintain because they are sensitive to the environmental conditions, such as the presence of moisture and mud, in which the agricultural machine often finds itself. In addition, such devices are influenced by the vibration and jolting of the agricultural machine, and electromagnetic interference between the electronic member and the agricultural machine engine. Again, as said electronic member determines deformation of a resilient element (flexure bar), the electrical signal corresponding to the deformation is subject to errors due to friction at the supports of the flexure bar and to the non-linearity thereof. Finally, with such devices it is not possible to obtain data on the different components of the force in a plane parallel to the travel direction of the implement.

SUMMARY OF THE INVENTION

The object of the present invention is to provide a force measurement device for controlling the position of an implement for towing by an agricultural machine, which is free from the aforesaid drawbacks.

The present invention provides a force measurement device for an implement for towing by an agricultural machine, of the type comprising at least one connection arm between said implement and a flexure bar mounted on said agricultural machine; at least one lever connecting said arm to a control system, characterized in that said control system comprises an electrical circuit arranged to control the movement of said lever by means of a mechanical and/or hydraulic member; said electrical circuit comprising at least one resistive element fixed on to a portion of said flexure bar, and said resistive element being constructed of a material of which the resistance is proportional to the deformation which said element undergoes when in use.

BRIEF DESCRIPTION OF THE DRAWINGS

The present invention will be more apparent from the description of two embodiments given hereinafter by way of non-limiting example with reference to the accompanying drawings.

FIG. 2 is a partly sectional partial view of a detail of the device of FIG. 1.

FIG. 4 is a section through a resistive element fixed to the element of FIG. 3.

FIG. 5 is an electrical circuit diagram.

DETAILED DESCRIPTION OF THE INVENTION

Figure 1:
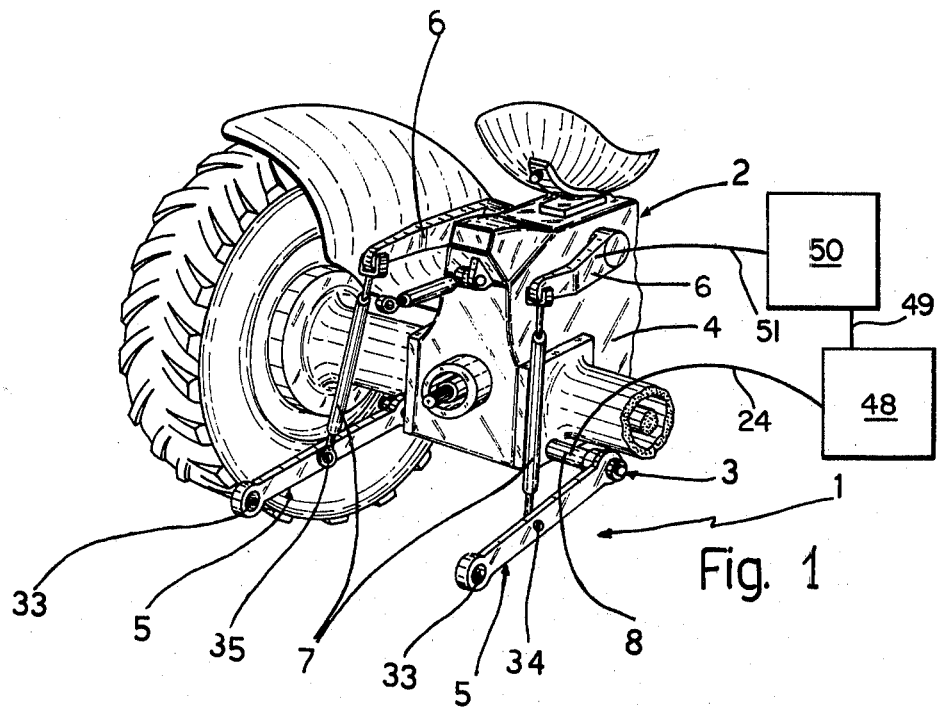
FIG. 1 is a perspective view of a force measurement device mounted on an agricultural machine.

As shown in FIG. 1, the reference numeral 1 indicates a force measurement device for controlling the position of an implement (not shown) for towing by an agricultural machine 2. The device 1 comprises a flexure bar 3 mounted horizontally inside a chassis 4 of the machine 2, two lower arms 5 connecting the bar 3 to said implement, a control system 48 arranged to cause two upper arms 6 to rotate about a bar (not shown) mounted inside the chassis 4 parallel to and above the bar 3, and two levers 7 connecting the arms 6 to the arms 5.

As shown in FIG. 2, the flexure bar 3 is housed inside a support element 8 fixed to the chassis 4 by a plurality of screws 11. The bar 3 has a central portion 12, two opposing end portions 13 emerging from the support element 8 and, between these latter and the portion 12, two intermediate portions 14. Through these latter there is a respective internally threaded diametrical bore 15 which is coaxial to a corresponding radial bore 16 provided in the support element 8, so that on tightening a respective screw 17, the bar 3 remains rigid with the support element 8. The intermediate portions 14 of the bar 3 at the ends of the support element 8 each comprise four axial recesses 18 spaced at 90° apart. On each recess 18 there is fixed a resistive element 21 constructed of a material having an electrical resistance which is proportional to the expansion or contraction thereof.

With reference to FIG. 4, because of the fact that any flexure of the bar 3 must produce a corresponding flexure of the element 21. Between element 21 and the surface of the recess 18 there is deposited a layer 22 of bonding material which rigidly joins the element 21 to the recess 18. The element 21 is provided with two terminals 23, to which respective electric cables 24 (FIG. 2) are soldered. A layer of grease is deposited on the rear end of the portion 14 in which the recesses 18 are provided, in order to protect the elements 21 from atmospheric agents.

With reference to FIG. 2, the support element 8 is provided at its ends with a respective cap 25 comprising a central through bore 26, through which the end portion 13 extends to the outside of the support element 8. The bore 26 in the cap 25 has a slightly greater diameter than that part of the portion 14 which it houses, so as to provide a predetermined gap in order to ensure that the bar 3 can deform when in operation, without being hindered by the cap 25. To prevent escape of the grease deposited on the elements 21, a seat 27 for a seal ring 28 is provided around the bore 26. The cap 25 is fixed to the support element 8 by a plurality of screws 31, and comprises a radial slot 32 through which the electric cables 24 extend to the outside.

Each lower arm 5 comprises at its ends a respective through bore 33 for connecting the bar 3 to the implement, and comprises in its center a through bore 34 engaged by a peg 35 on which one end of the level 7 is hinged. The bore 33 is engaged by the end portion 13 of the bar 3 by means of a ball-shaped bush 36 keyed on to the portion 13 and a bearing 37. To prevent the end of the arm 5 escaping from the bar 3, a shoulder ring 38 for the ball-shaped bush 36 is fixed to the end portion 13 by means of a bolt 41 passing through a pair of diametrical bores 42 and 43 provided in the ring 38 and portion 13 respectively, and having a nut 44 screwed on to its end which emerges from the ring 38. A shoulder ring 45 for the cap 25 is mounted on the end portion 13 between the ball-shaped bush 36 and the cap 25.

The resistance of the resistive elements 21 deposited on those recesses 18 lying in parallel planes perpendicular to the ground varies when a force having a component parallel to the ground is applied to the bar 3 by the implement, whereas the resistance of the resistive elements 21 deposited on the other recesses 18 varies when a force having a component perpendicular to the ground is applied to the bar 3 by the implement. Said control system 48 comprises an electrical circuit into which the resistive elements 21 are connected by means of electric cables 24, and a mechanical and/or hydraulic member 50 which on the basis of the electrical signal 49 arriving from said electrical circuit raises or lowers the lower arms 5 and thus the implement by means of the operation of the upper arms 6 and levers 7 by mechanical coupling 51. Such a system is well known to those skilled in the art as set forth in U.S. Pat. No. 3,814,188. As already described, the resistive elements 21 are constructed of a material having the property of possessing an electrical resistance which is a function of the deformation to which the elements 21 are subjected when in use. The elements 21 can be of the metal film, thick film or semiconductor type. Generally it is preferably to use elements 21 of the thick film type because these are more robust, have a greater sensitivity to deformation, a lower sensitivity to environmental conditions, and a greater ease of installation. The elements 21 can be obtained by manufacturing the flexure bar 3 with recesses 18, fixing a layer 22 of an electrical insulating material, preferably of the porcelain type, onto recesses 18, and fixing layer 22 with resistive element 21. The material used for constructing the elements 21 is generally a paste based on glass and conductor metals, which is deposited and baked on the layer 22 of bonding material, this being generally glass-based. The layer 22 gives the elements 21 good adhesion to the coated material without slippage. The terminals 23 are generally constructed of an alloy comprising a noble metal.

Figure 3:
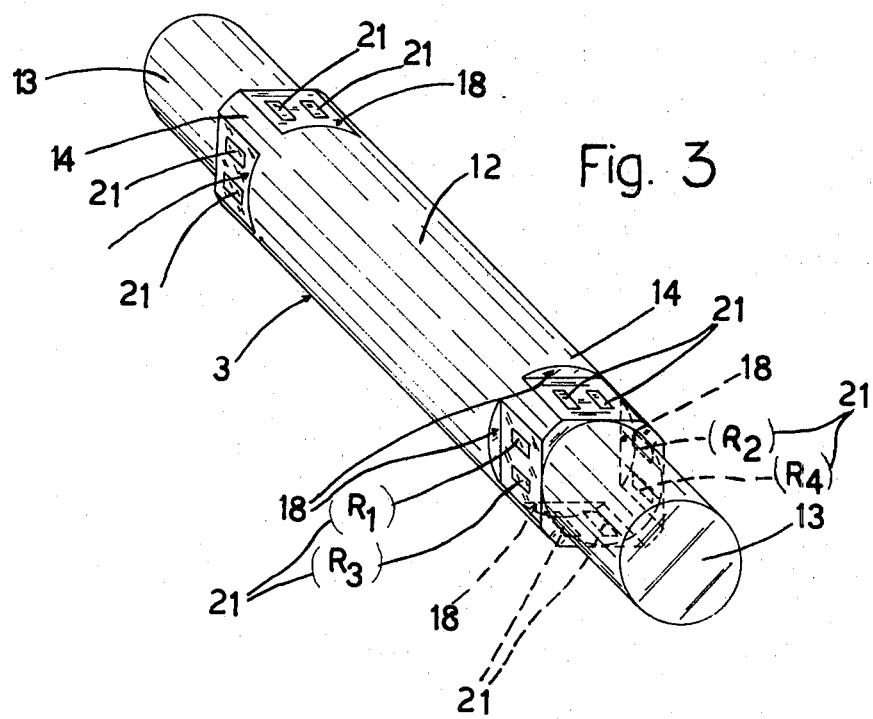
FIG. 3 is a perspective view of a different embodiment of a constituent element of the detail of FIG. 2.

In the embodiment shown in FIG. 3, the recesses 18 of the flexure bar 3 are greater than those already described, in order to enable a pair of resistive elements 21 to be deposited on each recess 18. If the resistive elements deposited on the recesses 18 lying in planes perpendicular to the ground are indicated by R1 and R3 and by R2 and R4 respectively, then these form part of said electrical circuit for controlling the mechanical and/or hydraulic member. This part of the electrical circuit is illustrated in FIG. 5, and comprises a closed network in which the elements 21 indicated by R1, R2, R3 and R4 are connected in series. Two feed terminals 46 are connected between R1 and R4 and between R2 and R3, and two output terminals 47 are connected between R1 and R2 and between R3 and R4. A circuit is therefore formed of the "Wheatstone Bridge" type. If R1, R2, R3 and R4 have equal electrical resistance, then for an electric potential difference Vi applied between the terminals 46, an electric potential difference $Vu=0$ is obtained between the terminals 47. The bridge is thus balanced. If the bar 3 deforms by flexure, then according to the direction of the force applied by the implement, there is an expansion of one pair of elements 21 deposited on a recess 18 perpendicular to the ground, and a contraction of the pair of elements 21 deposited on the recess 18 parallel to the preceding or vice versa. It is therefore apparent that R1 and R3 increase their resistance and R2 and R4 reduce their resistance or vice versa. In this case, the bridge becomes unbalanced and a potential difference Vu is obtained which is no longer zero, but is a function of the unbalance of the bridge, i.e. of the change in the resistance of the elements 21, and is therefore a function of the deformation of the bar 3 consequent on the force applied by the implement.

A similar circuit arrangement can be formed from the resistive elements 21 deposited on the recesses 18 lying in the planes parallel to the ground. The horizontal and vertical components of a force of any direction lying in a plane perpendicular to the axis of the flexure bar 3 can be determined by processing the output signals of the two circuit arrangements.

The control system can be preset such that for a force from an implement exceeding a predetermined value which depeends on the power of the agricultural machine 2, the electrical circuit comprising the resistive elements 21 causes the implement to rise by means of said mechanical and/or hydraulic member.

Many advantages derive from the present invention.

More specifically, the devices 1 constructed in accordance with the present invention have greater sensitivity to deformations of the bar 3, and have a high speed of action. To cause the control system to act in the case of such devices 1, it is not necessary for the bar 3 to deform considerably, and in fact a small deformation which would naturally lead to a deformation of the resistive elements 21 is sufficient. Thus as the bar 3 does not have to deform excessively, it is subject to low wear and can be constructed of a low-cost material. Furthermore, with said devices 1, the force determination is not influenced by the vibration or jolting of the agricultural machine 2, nor by the environmental conditions under which the machine 2 is operating. The devices 1 are also of high precision, easy installation and low maintenance. The electrical circuit of the device 2 heretofore described is not subject to interference from the operation of the engine of the machine 2, or to errors due to friction of the supports of the bar 3. Finally, the devices 1 constructed in accordance with the present invention allow determination of a force in any direction lying in a plane orthogonal to the axis of the bar 3.

Finally, it is apparent that modifications can be made to the embodiment of the present invention without leaving the scope of the inventive idea.

In particular, the geometrical characteristics of the element 21 can be of various types, and the number of elements 21 deposited on each recess 18 can be different. Furthermore, it is possible to use for the elements 21 a metal support fixed to the bar 3 for example by welding, and on which the layer 22 of bonding material is deposited. Finally, many circuit arrangements can be used for controlling said mechanical and/or hydraulic member.

What we claim is:

1. A resistive force measurement device for an implement towed behind an agricultural machine, comprising a flexure bar mounted on said agricultural machine, at least one connection arm between said implement and said flexure bar, a control system, at least one lever connecting said arm to said control system, said control system comprising an electrical circuit arranged to control the movement of said lever by means of a mechanical and/or hydraulic member, wherein said electrical circuit comprises at least one resistive element integral with a portion of said flexure bar and capable of measuring a resistive force parallel to the ground, and at least one resistive element integral with a portion of said flexure bar and capable of measuring a resistive force perpendicular to the ground, so that the resistance of said implement is proportional to the deformation which said resistive elements undergo when in use, said resistive elements being fused upon an electric insulating material which is fixed to said flexure bar.

2. The device of claim 1, wherein said flexure bars are provided with two first seats, on each of which is mounted at least one of said resistive elements, said first seats lying respectively in two parallel horizontal planes, and two second seats, on each of which is mounted at least one of said resistive elements, said second seats lying respectively in two vertical planes, said resistive elements on said first and second seats in respective perpendicular planes being connected to adjacent sides of a Wheatstone bridge.

3. The device of claim 1, wherein said resistive elements are of the thick film type.

4. The device of claim 1 in which said resistive elements are of the metal film type.

5. The device of claim 1 in which said resistive elements are of the semiconductor type.

* * * * *